(12) United States Patent
Davis et al.

(10) Patent No.: US 8,704,783 B2
(45) Date of Patent: Apr. 22, 2014

(54) EASY WORD SELECTION AND SELECTION AHEAD OF FINGER

(75) Inventors: Shawna Julie Davis, Seattle, WA (US); Peter G. Chin, Seattle, WA (US); Tirthankar Sengupta, Redmond, WA (US); Priyanka Singhal, Bellevue, WA (US); Benjamin F. Carter, Redmond, WA (US); Peter Gregory Davis, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

(21) Appl. No.: 12/819,062

(22) Filed: Jun. 18, 2010

(65) Prior Publication Data

US 2011/0310026 A1 Dec. 22, 2011

Related U.S. Application Data

(63) Continuation-in-part of application No. 12/731,061, filed on Mar. 24, 2010.

(51) Int. Cl.
*G06F 3/041* (2006.01)

(52) U.S. Cl.
USPC .......................................................... 345/173

(58) Field of Classification Search
CPC ...................................................... G06F 3/041
USPC ............. 345/173; 341/22; 715/784, 780, 816, 715/863
See application file for complete search history.

(56) References Cited

U.S. PATENT DOCUMENTS

| | | |
|---|---|---|
| 4,190,835 A | 2/1980 | Buynak |
| 4,633,432 A | 12/1986 | Kitamura |
| 4,739,314 A | 4/1988 | McCaskill et al. |
| RE32,773 E | 10/1988 | Goldwasser et al. |
| 5,051,930 A | 9/1991 | Kuwabara et al. |
| 5,122,953 A | 6/1992 | Uekusa et al. |
| 5,583,981 A | 12/1996 | Pleyer |
| 5,666,139 A | 9/1997 | Thielens et al. |
| 5,666,552 A | 9/1997 | Greyson et al. |
| 5,778,404 A | 7/1998 | Capps et al. |
| 5,825,352 A | 10/1998 | Bisset |

(Continued)

FOREIGN PATENT DOCUMENTS

WO  WO 2010/135127  11/2010

OTHER PUBLICATIONS

Olwal et al., "Rubbing and Tapping for Precise and Rapid Selection on Touch-Screen Displays," *Proceedings of CHI 2008 (SIGCHI Conference on Human Factors in Computing Systems)*, Florence, Italy, Apr. 5-10, 2008, pp. 295-304.

(Continued)

*Primary Examiner* — Fred Tzeng
(74) *Attorney, Agent, or Firm* — Andrew Sanders; Micky Minhas

(57) ABSTRACT

The described embodiments allow for the selection of content in a touch screen display. The method includes detecting a single tap on a word of text in a text editing field in a touch screen, and responsive to the single tap selecting the word of text in whole. In another embodiment additional content can be selected. Contact with selected content displayed in a touch screen can be detected. The contact with the touch screen can be detected moving in a direction along the selected content. Additional content is selected by selecting a word of text adjacent to the selected content being contacted.

17 Claims, 10 Drawing Sheets

(56) References Cited

U.S. PATENT DOCUMENTS

| | | |
|---|---|---|
| 5,857,212 A | 1/1999 | Van De Vanter |
| 5,905,486 A | 5/1999 | Brittenham et al. |
| 6,115,482 A | 9/2000 | Sears |
| 6,137,472 A | 10/2000 | Pekelney et al. |
| 6,204,848 B1 | 3/2001 | Nowlan et al. |
| 6,232,969 B1 | 5/2001 | Fawcett |
| 6,310,610 B1 | 10/2001 | Beaton et al. |
| 6,340,967 B1 | 1/2002 | Maxted |
| 6,677,928 B1 | 1/2004 | Brodey |
| 6,714,221 B1 | 3/2004 | Christie et al. |
| 6,854,090 B2 | 2/2005 | Yu |
| 6,927,783 B1 | 8/2005 | MacInnis et al. |
| 7,006,074 B2 | 2/2006 | Chesters |
| 7,024,623 B2 | 4/2006 | Higashiyama et al. |
| 7,030,861 B1 | 4/2006 | Westerman et al. |
| 7,091,954 B2 | 8/2006 | Iesaka |
| 7,113,178 B1 | 9/2006 | Webb |
| 7,149,550 B2 * | 12/2006 | Kraft et al. ............... 455/566 |
| 7,177,797 B1 * | 2/2007 | Micher et al. .................. 704/9 |
| 7,355,583 B2 | 4/2008 | Beardsley |
| 7,356,760 B2 | 4/2008 | Jaeger |
| 7,380,203 B2 | 5/2008 | Keely |
| 7,456,850 B2 | 11/2008 | Meier et al. |
| 7,954,054 B2 | 5/2011 | Iwema et al. |
| 7,966,578 B2 | 6/2011 | Tolmasky et al. |
| 8,299,943 B2 * | 10/2012 | Longe ............................ 341/22 |
| 2002/0156615 A1 | 10/2002 | Takatsuka et al. |
| 2004/0019849 A1 | 1/2004 | Weng et al. |
| 2004/0027398 A1 | 2/2004 | Jaeger |
| 2004/0083109 A1 | 4/2004 | Halonen et al. |
| 2004/0179001 A1 | 9/2004 | Morrison et al. |
| 2004/0249627 A1 | 12/2004 | Mirkin |
| 2005/0057524 A1 | 3/2005 | Hill |
| 2005/0193321 A1 | 9/2005 | Iwema |
| 2006/0026536 A1 | 2/2006 | Hotelling |
| 2006/0064640 A1 | 3/2006 | Forlines et al. |
| 2006/0072137 A1 | 4/2006 | Nishikawa et al. |
| 2006/0119588 A1 | 6/2006 | Yoon et al. |
| 2006/0253803 A1 | 11/2006 | Backlund |
| 2006/0256088 A1 | 11/2006 | Kong |
| 2007/0061753 A1 * | 3/2007 | Ng et al. ..................... 715/816 |
| 2007/0125633 A1 | 6/2007 | Boillot |
| 2007/0229466 A1 | 10/2007 | Peng |
| 2007/0234235 A1 | 10/2007 | Scott |
| 2007/0260981 A1 * | 11/2007 | Kim et al. .................... 715/531 |
| 2007/0294644 A1 | 12/2007 | Yost |
| 2008/0048997 A1 | 2/2008 | Gillespie |
| 2008/0084400 A1 | 4/2008 | Rosenberg |
| 2008/0148177 A1 | 6/2008 | Lang et al. |
| 2008/0165142 A1 | 7/2008 | Kocienda |
| 2008/0259040 A1 | 10/2008 | Ording |
| 2008/0309632 A1 | 12/2008 | Westerman |
| 2009/0058830 A1 | 3/2009 | Herz |
| 2009/0109182 A1 * | 4/2009 | Fyke et al. ................... 345/173 |
| 2009/0113353 A1 | 4/2009 | Bansal et al. |
| 2009/0187846 A1 * | 7/2009 | Paasovaara .................. 715/780 |
| 2009/0189862 A1 | 7/2009 | Viberg |
| 2009/0204888 A1 | 8/2009 | Miyamoto |
| 2009/0217158 A1 | 8/2009 | Bailey |
| 2009/0228842 A1 * | 9/2009 | Westerman et al. .......... 715/863 |
| 2009/0249232 A1 | 10/2009 | Lundy |
| 2010/0066764 A1 | 3/2010 | Refai |
| 2010/0159892 A1 | 6/2010 | Dunnam et al. |
| 2010/0235726 A1 | 9/2010 | Ording et al. |
| 2010/0235729 A1 | 9/2010 | Kocienda et al. |
| 2010/0245261 A1 * | 9/2010 | Karlsson ...................... 345/173 |
| 2010/0295798 A1 | 11/2010 | Nicholson et al. |
| 2010/0302281 A1 | 12/2010 | Kim |
| 2010/0328317 A1 | 12/2010 | Lindfors |
| 2011/0010668 A1 | 1/2011 | Feldstein et al. |
| 2011/0029917 A1 | 2/2011 | Um |
| 2011/0035209 A1 | 2/2011 | Macfarlane |
| 2011/0109581 A1 | 5/2011 | Ozawa et al. |
| 2011/0134029 A1 | 6/2011 | Park et al. |
| 2011/0239153 A1 * | 9/2011 | Carter et al. ................. 715/784 |

OTHER PUBLICATIONS

ThomasNet News, "Touch Sensor Features Gesture Recognition Technology," <http://news.thomasnet.com/fullstory/543504>, Published Date: Apr. 28, 2008, 3 pages.

"Virtual On-Screen Keyboard for any Taste," <http://hot-virtual-keyboard.com/>, Published Date: Dec. 15, 2009, 1 page.

"iPhone OS 3.0: How to cut, copy and paste text and images," <http://www.iphonic.tv/2009/06/iphone_os_30_how_to_cut_copy_a.html>, accessed Jun. 18, 2010, 11 pages.

Microsoft Office, "Select text by using the mouse," <http://office.microsoft.com/en-us/word-help/select-text-HA010096402.aspx#BM1>, accessed Jun. 18, 2010, 4 pages.

Apple, "Vision," <http://www.apple.com/accessibility/iphone/vision.html>, 8 pages, Accessed Aug. 9, 2011.

Hillebrand, "How to Make your Windows Mobile Touch Screen Finger-Friendly," Published Date: Apr. 22, 2008, <http://www.mobilitysite.com/2008/04/how-to-make-your-windows-mobile-touch-screen-finger-friendly/>, 4 pages (retrieved Mar. 24, 2010).

PCWorld, "Magnifying Glass Pro description, Database Downloads List by 30 Day Change," <http://www.pcworld.com/downloads/file/fid,71819-order,4-c,database/description.html>, Added Feb. 1, 2010, pp. 1-4, Downloaded Mar. 31, 2011.

Ramos et al., "Zliding: Fluid Zooming and Sliding for High Precision Parameter Manipulation," UIST '05, Oct. 23-27, 2005, pp. 143-152.

Stoup, "The New 12" MacBook will have an iPhone-Like Interface," Published Date: Jan. 17, 2007, <http://www.applematters.com/article/the-new-12-macbook-will-have-an-iphone-like-interface/>, 7 pages (retrieved Jan. 22, 2010).

"My-T-Touch for Windows Indestructible Keyboards and Indispensable Utilites, Version 1.78, Release 4, User's Guide," Released Date: Nov. 24, 2009, <http://www.imgpresents.com/myttouch/guide/mtta4.pdf>, 187 pages (retrieved Jan. 22, 2010).

* cited by examiner

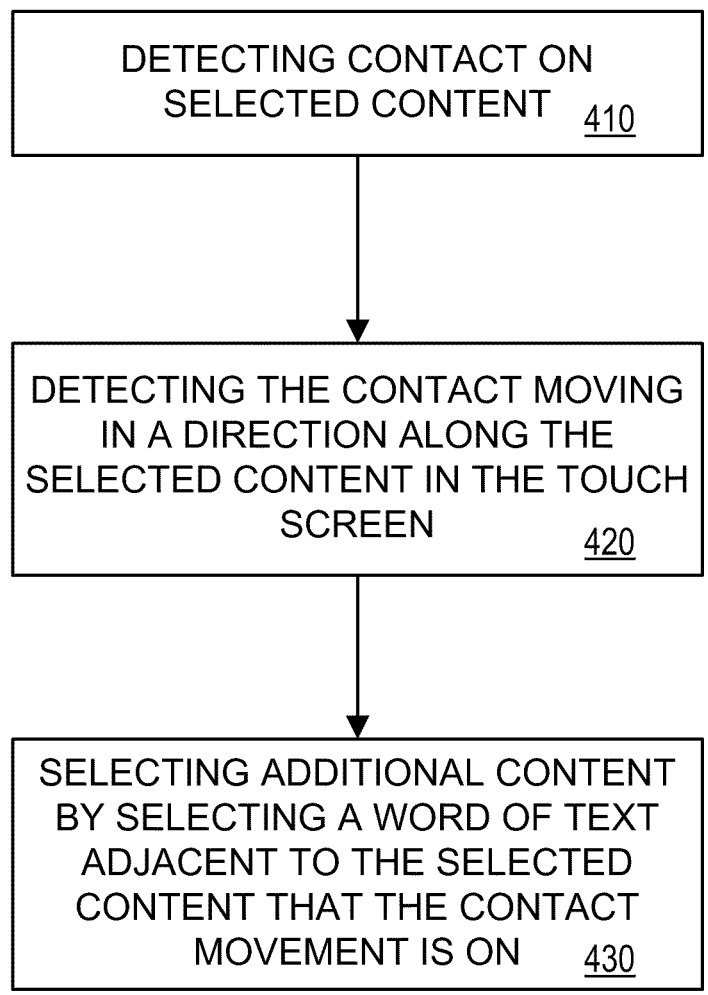

EASY WORD SELECTION AND SELECTION AHEAD OF FINGER

CROSS REFERENCE TO RELATED APPLICATION

This application is a Continuation-in-Part of U.S. patent application Ser. No. 12/731,061, filed Mar. 24, 2010, which is hereby incorporated by reference.

FIELD

The disclosed embodiments relate generally to user interfaces, and more particularly to a selection user interface.

BACKGROUND

With the increasing popularity of mobile devices, including cellphone devices, handheld devices, handheld computers, smartphones, PDAs, etc., there is a need for improving the user interface experience.

Mobile devices with capacitive or resistive touch capabilities are well known. Modern mobile phones have evolved over recent years to the point where they now possess a broad range of capabilities. They are not only capable of placing and receiving mobile phone calls, multimedia messaging (MMS), and sending and receiving email, they can also access the Internet, are GPS-enabled, possess considerable processing power and large amounts of memory, and are equipped with high-resolution color liquid crystal displays capable of detecting touch input. As such, today's mobile phones are general purpose computing and telecommunication devices capable of running a multitude of applications. For example, modern mobile phones can run, word processing, web browser, navigation system, media player and gaming applications.

Along with these enhanced capabilities has come a demand for larger displays to provide a richer user experience. Mobile phone displays have increased in size to the point where they can now consume almost the entire viewing surface of a phone. To increase the size of displays any further would require an increase in the size of the phones themselves. Even with the display size being at its maximum, the content on the display remains relatively small.

Indeed, a finger touching the display can obfuscate the very content being manipulated, making precise operations difficult. For example, selecting text often requires a user to grab and drag an insertion cursor. Additionally, because a single tap can be performed easily it is often reserved for cursor placement in a text editing field. However, a cursor is generally small relative to a user's finger and often positioned amongst other characters. As a result, upon user contact, a touch screen needs to decide whether the user is attempting to grab a cursor, or place the cursor in a different position. With the user's finger covering both the cursor and text simultaneously, it is difficult to know what operation is being attempted. Furthermore, the finger often covers text being selected because the cursor moves between characters that are hidden from view. As a result, touch screen user interfaces for selection often obscure text and provide inconsistent results, which cause user frustration.

SUMMARY

This Summary is provided to introduce a selection of concepts in a simplified form that are further described below in the Detailed Description, which proceeds with reference to the accompanying figures. This Summary is not intended to identify key features or essential features of the claimed subject matter, nor is it intended to be used to limit the scope of the claimed subject matter.

The above deficiencies and other problems associated with interacting with touch screen displays are reduced or eliminated by the disclosed selection embodiments. The claimed subject matter is not limited to implementations that solve any or all of the noted disadvantages.

The described embodiments allow for the selection of content in a touch screen display. In one embodiment a word displayed in a touch screen can be selected in whole by single tapping on the word in the display.

In another embodiment, an area of selected content can be extended by selecting additional content displayed in the touch screen ahead of finger contact. Some selected content displayed in a touch screen can be contacted and the contact can be dragged across the touch screen so that words of text can be selected that are adjacent to the content being contacted.

In yet another embodiment, selected words can be deselected in whole as contact moves off of the words. In a further embodiment content can be selected by wrapping selection along lines of text ahead of finger contact moving along lines of text.

The foregoing and other features and advantages will become more apparent from the following detailed description, which proceeds with reference to the accompanying figures.

BRIEF DESCRIPTION OF THE DRAWINGS

FIG. 4 is a block diagram illustrating an exemplary method of selecting content displayed in a touch screen.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Figure 1A:
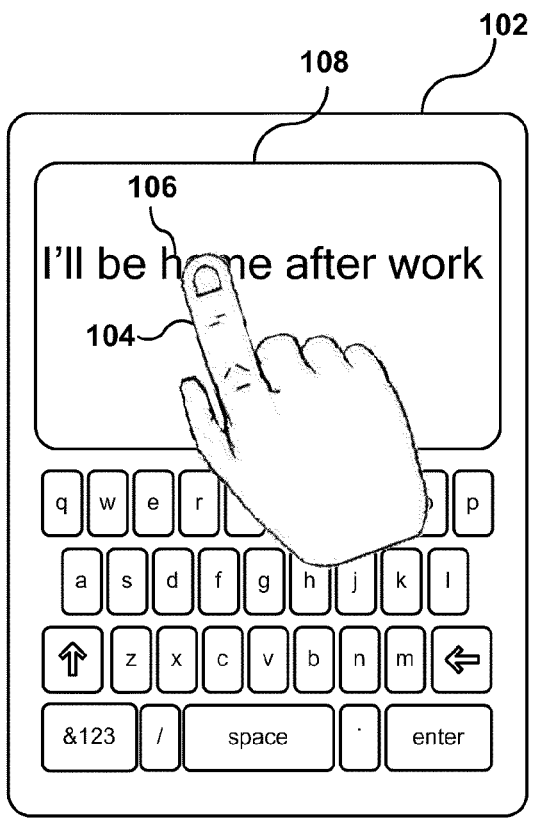
FIG. 1A illustrates an exemplary embodiment of single tapping a word in a mobile device touch screen.
Figure 1B:
FIG. 1B illustrates an exemplary embodiment of selecting a word that has been single tapped in a mobile device touch screen.

Accordingly, FIGS. 1A-B illustrate an exemplary embodiment of selecting a word displayed in a mobile device touch screen 102. In FIG. 1A, an end-user wanting to select a word displayed in the mobile device touch screen 102, uses finger 104 to single tap on the word "home" 106 displayed in a text-edit field 108 in the mobile device touch screen 102. In FIG. 1B, the mobile device touch screen 102 detects the single tap on the word "home" 106 and selects the whole word "home" 106.

Figure 2:
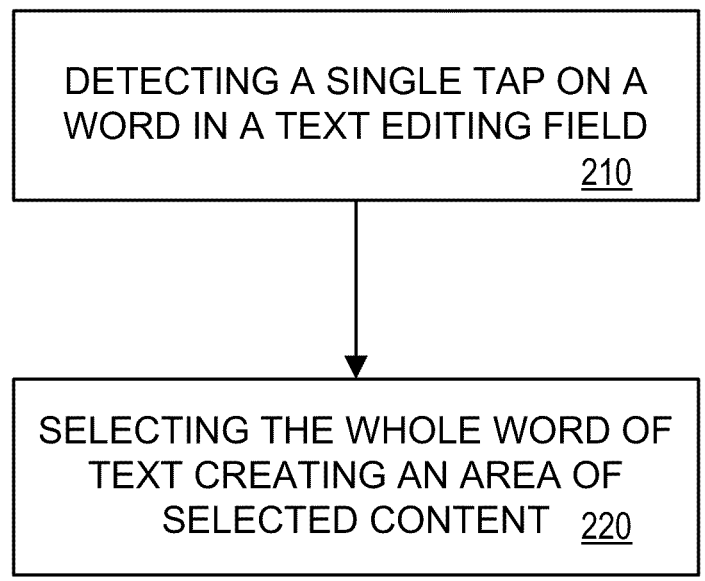
FIG. 2 is a block diagram illustrating an exemplary method of selecting a word displayed in a touch screen.

FIG. 2 is a block diagram illustrating an exemplary method of selecting a word displayed in a touch screen. At block 210 a touch screen can detect a single tap on a word in a text editing field. At block 220 the word of text can be selected in whole creating an area of selected content. For example, a whole word can be the area of selected content, so the whole word is selected. In one embodiment, the whole word can be selected at the same time. For example, all the characters of a word are selected at the same time as a single block of text, and the characters are not selected incrementally over time. Among other efficiencies, selecting a portion of content (such as a whole word) as a block can be more efficient because mobile device touch screens can be small relative to finger size, and manipulating individual characters of text can be difficult requiring time-consuming precision. In various embodiments a single tap on a word can select only the word in whole and no other text.

Additionally, in one embodiment of a single tap, the single tap can be detected when contact is made with the touch screen, and the contact is removed from the touch screen within a predetermined time. For example, the contact and removal of the contact can be less than a second (e.g. between 1 and 500 ms). Also, the single tap on the touch screen can be made with a stylus, or a finger.

In some embodiments, content can be selected by highlighting the content in the touch screen display, or changing the displayed color of the content in the display. For example, a word can be highlighted when an area of the display that contains the word is changed in color or designated visually in some other manner. In other embodiments, selected text can be displayed with a different color than the color of unselected text, or displayed as underlined. In various embodiments, selection of text can persist in the touch screen display until it is canceled, deleted, or removed. In some embodiments selected text can be marked for common editing functions, such as copying, deleting, and other functions.

Figure 3A:
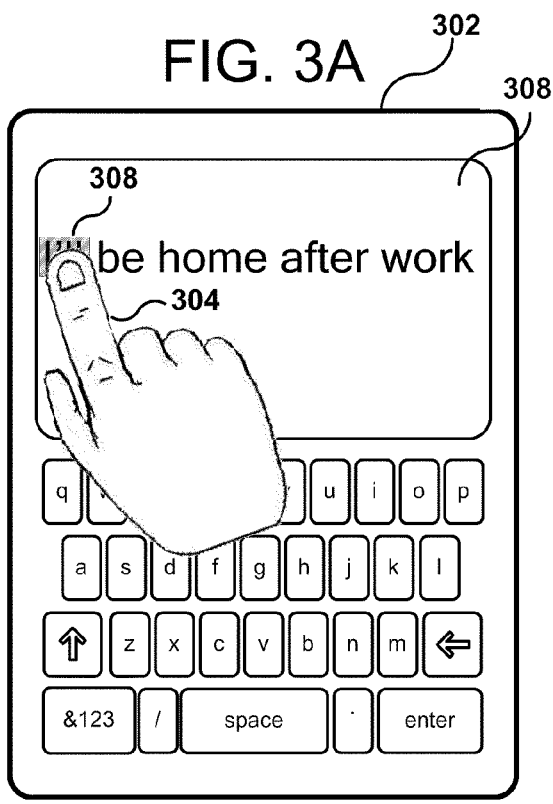
FIG. 3A illustrates a finger making contact on a selected word displayed in a touch screen.
Figure 3B:
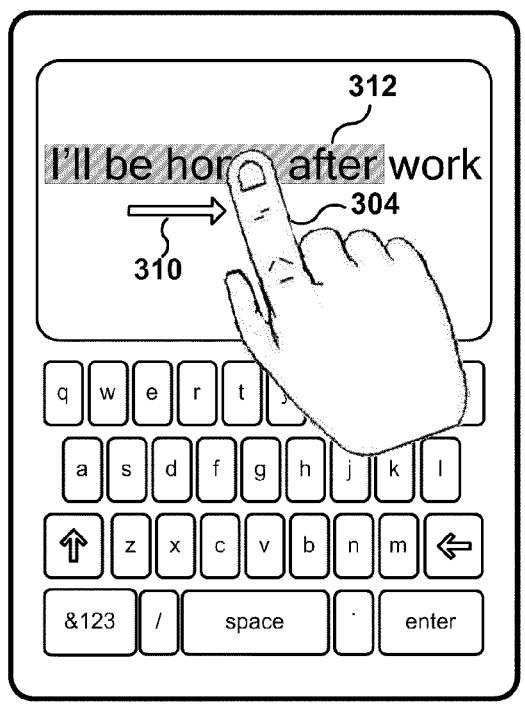
FIG. 3B illustrates an exemplary embodiment of selecting a word of text ahead of finger movement in a touch screen.
Figure 3C:
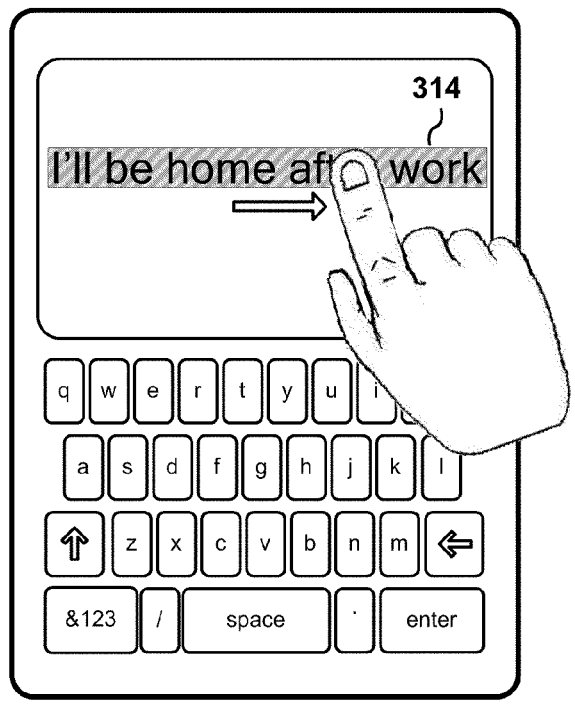
FIG. 3C illustrates an embodiment of selecting a word of text ahead of finger movement in a touch screen.

FIGS. 3A-C illustrate an exemplary embodiment of selecting words of text displayed in a touch screen 302. As illustrated in FIG. 3A a touch screen 302 can detect a user's finger 304 making contact with the touch screen 302 on a selected word "I'll" 306 in a text-edit field 308. This contact can be detected while contact has been maintained with the screen (e.g. a drag) or when the end-user newly contacts the touch screen (e.g. a press). In FIG. 3B the touch screen detects the user's finger 304 dragging along the touch screen in direction 310 along content displayed in the touch screen 302. In response to the contact movement in direction 310, the touch screen 302 selects additional words of displayed text before the user's finger 304 moves over the displayed text. In FIG. 3B the whole word "after" 312 is selected before the sliding user's finger and detected point of contact with the touch screen are on the word "after" 312. In FIG. 3C the user's finger 304 continues to be dragging along the touch screen and the next whole word "work" 314 is selected before the user's finger 304 is over the word "work" 314. Thus selection can be based on word units and based on the user's direction of movement. Because of the contact movement, the user's desire to select the next word can be anticipated, despite the user's finger not being in contact with the next word.

FIG. 4 is a block diagram illustrating an exemplary method of selecting content displayed in a touch screen. In various implementations, the illustrated process blocks may be merged, divided into sub-blocks, or omitted. At block 410 a touch screen can detect contact on selected content displayed in the touch screen. For example a user's finger can contact a touch screen display on a selected word in the display. At block 420 the touch screen can detect the contact moving in a direction along the selected content in the touch screen. For example, the end-user can drag a finger across the selected word and the touch screen can detect the direction of contact movement. Also, for example, selected content can be selected words, characters, sentences, and graphics displayed in a touch screen.

Furthermore at block 430, relative to the direction of contact movement, additional content can be selected by selecting a word of text adjacent to the selected content that the contact movement is on. For example, as the user's finger is moving across the selected word and approaching a next word, that next word is selected in front of the finger. In one implementation a whole word is selected before the detected contact movement is on or over the displayed word. For example, all the text characters of the word are selected at the same time. In another embodiment, as the contact movement moves across words of text, the words are selected in whole word increments. For example, each word in a sentence will be selected when the contact movement approaches the end of the previous word in the sentence and before the contact movement is on the word. In this embodiment, selecting whole words ahead of the contact movement made by a finger allows an end-user to see what word is being selected. For example, a finger contacting a touch screen can obscure text under the finger, so selecting content in front of an end-user's finger movement can give the end-user clear feedback on what words are being selected.

In one exemplary embodiment of selecting ahead of a finger, content can be selected as detected contact movement approaches the end of a word or approaches the beginning of a word. For example, when selecting content, an end-user's finger can slide across the content and when the finger approaches a predefined distance before the end of a word, the next word in the line of text is entirely selected. In another exemplary embodiment, a next word in a line of text can be selected before contact leaves the previous word. Also, a word can be selected as the contact movement approaches the beginning of the word, or a predefined distance before the word. In another embodiment of selecting ahead of a finger, content can be selected as detected contact movement crosses a defined indicator. For example, as a finger's contact movement crosses an indicator for an end of a word the next word can be selected.

In other embodiments, selection can be extended in any direction by pressing and dragging on selected content. For, example a press and drag can be detected when an end-user newly contacts the touch screen (e.g. a press) and maintains contact with the touch screen by moving the finger and point of contact along the touch screen (e.g. a drag).

Figure 5:
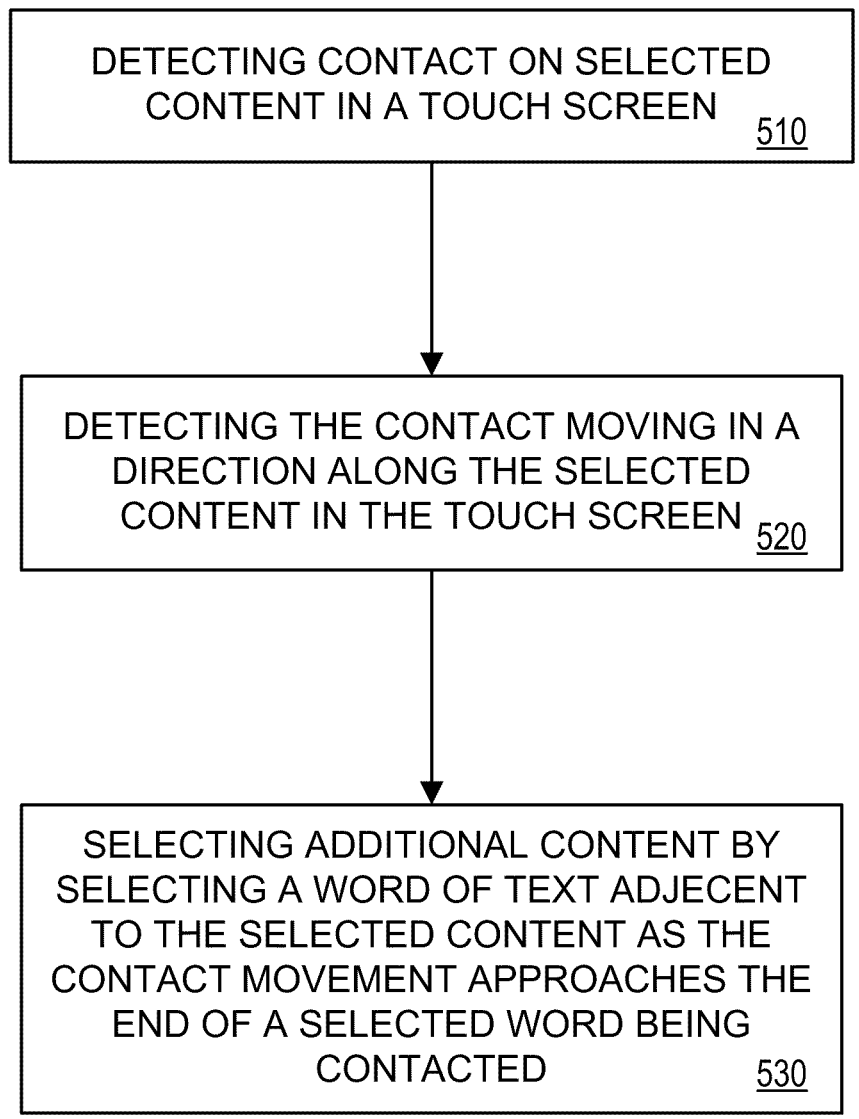
FIG. 5 is a block diagram illustrating an exemplary method of selecting content displayed in a touch screen.

FIG. 5 is a block diagram illustrating an exemplary method of selecting content in a touch screen display. At block 510 a touch screen can detect contact on selected content displayed in the touch screen. For example an end-user can contact the touch screen on a selected word in the touch screen with a finger. At block 520 the touch screen can detect the contact moving in a direction along the selected content in the touch screen. For example, the end user can drag the finger across the selected word and the touch screen can detect the direction of contact movement. At block 530, additional content can be selected by selecting a word of text adjacent to the selected content as the contact movement approaches the end of a selected word being contacted. For example, the end-user can drag the finger contacting the touch screen along the selected word and as the finger approaches the end of the selected word the selection area jumps or "jogs" to the end of the next word in the line of text ahead of the finger. In another embodiment, when being selected each character of the word is selected at the same time so the whole word is selected as a block of text.

Additionally, the described selected content can be, for example, text in a text editing field, text within a touch screen display, emoticons, or other graphics displayed within a touch screen. For example, a text editing field can be a field in a display where text can be manipulated for editing. A text edit field can have a cursor, and can allow common text editing functions including but not limited to adding and deleting text in the field. In various embodiments, text can be added to and deleted from a text editing field at a position indicated by a cursor in the field. An end-user can often manipulate the text in a text editing field using a physical keyboard, or a soft keyboard displayed on the touch screen.

In any of the described embodiments herein contact with a touch screen can be detected as an area of contact or a point of contact with the touch screen. For example, a point of contact can be detected contact with a small portion of the touch screen of a predetermined size. In another embodiment, a point of contact can be a representative point of a larger area of contact with the touch screen. An area of contact can be detected contact with a portion of the touch screen. For example, an area of contact can be the area of contact that is detected when a finger touches the touch screen.

Figure 6A:
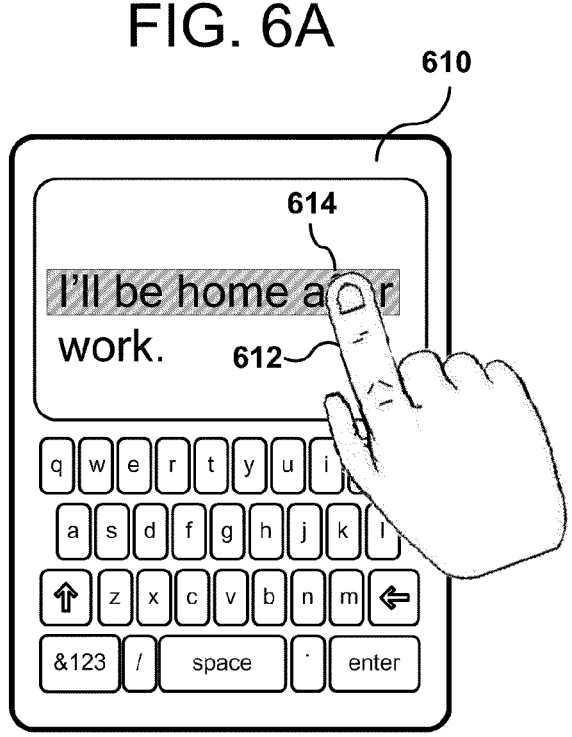
FIG. 6A illustrates an embodiment of detecting a finger contacting a selected word in an area of selected content.
Figure 6B:
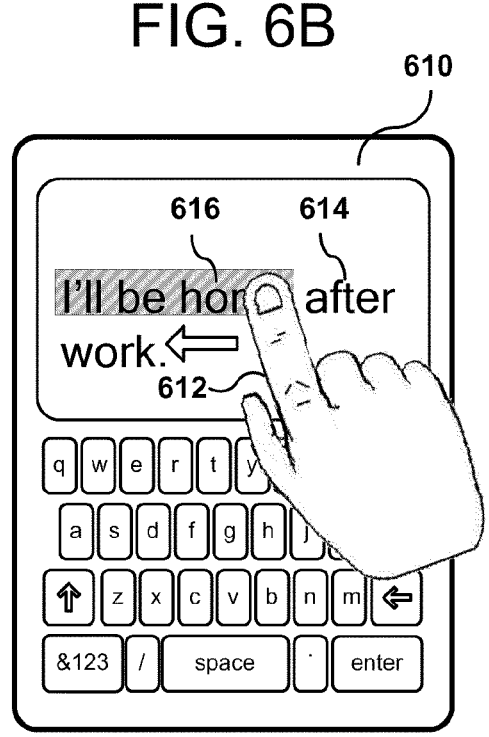
FIG. 6B illustrates an exemplary embodiment of deselecting a word displayed in a touch screen.

Attention is now directed to FIGS. 6A-B that illustrate an exemplary method of deselecting content displayed in a touch screen 610. FIG. 6A shows an end-user's finger 612 contacting the touch screen 610 on the selected word "after" 614 displayed in the touch screen 610. This contact can be detected while contact has been maintained with the screen (e.g. a drag) or when the end-user newly contacts the touch screen (e.g. a press). In FIG. 6A the selected word "after" 614 is at the end of a line of selected text, but in other implementations the selected content contacted can be toward either end of an area of selected text. FIG. 6B shows the end user reducing the selection by dragging finger 612 across a line of text in a direction along the selected content from the word "after" 614 to the word "home" 616. The word "after" 614 is deselected when the end-user's finger 612 is moved off of the word "after" 614. In one implementation the whole word is deselected when the contact is moved off of the word. For example, each character of the word is deselected at the same time. In alternate embodiments portions of the word can be deselected as the contact is moved off of the word. In other embodiments, detecting movement off of a word can be done by detecting the contact movement passing an indicator, approaching another word, or moving a predefined distance from the word. For example, a finger can drag off the word and the touch screen can detect that the contact has crossed an indicator for the end of the word, so the word is then deselected.

Figure 7A:
FIG. 7A illustrates an embodiment of detecting a finger for multi-line selection.
Figure 7B:
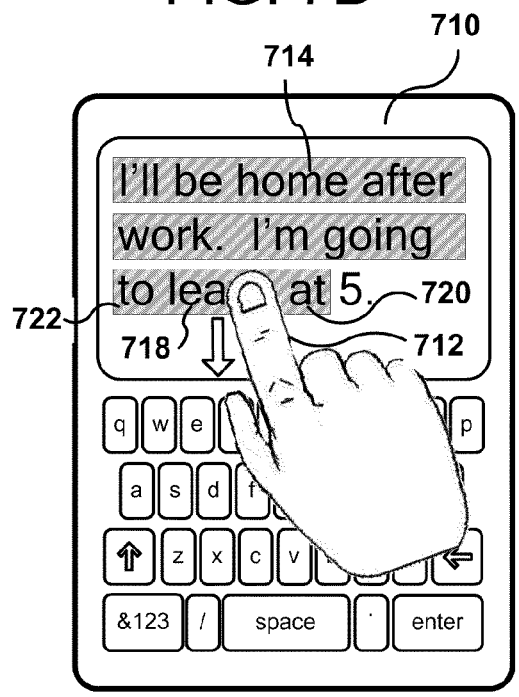
FIG. 7B illustrates an embodiment of multi-line selection of content ahead of finger contact in a touch screen display.

FIGS. 7A-B. illustrate an exemplary method of multi-line selection of content ahead of a finger in a touch screen display 710. In FIG. 7A, an end-user's finger 712 contacts a word "home" 714 in an area of selected content 715. For example, the word "home" 714 can be selected by single tapping the word "home" 714. The contact with the selected word "home" 714 can be detected while contact has been maintained with the screen (e.g. a drag) or when the end-user re-contacts the touch screen (e.g. a press). At FIG. 7B to select more words in the display, the end user's finger 712 is dragged generally downward or substantially perpendicular to the direction of the selected text along the touch screen 710 from the selected word "home" 714 in one line of text to the word "leave" 718 in a lower line of text. As, the detected contact of the end-user's finger 712 moves downward along the touch screen 710, the content from the selected word "home" 714 to the word "at" 720 is selected. The lines of text can be selected by wrapping the selection along the lines of content from the selected content up to the word located at the contact with the touch screen. Additionally, the whole word "at" 720 can also be selected as being the first word, in the line of text, that ends passed the contact with the touch screen. The word "at" 720 can be a final selection word that is in the same line of text as the contact with the touch screen, next to the word the contact is on, and passed the text in the line of text that was selected by wrapping. As the end-user's finger 712 covers content in the touch screen 710, selecting the word passed (i.e. the next word) the end-user's finger in whole gives the end-user a clear visual of the last selected word "at" 720 in the extended area of selected content 724.

In other embodiments contact movement can be in an upward direction and can select content by wrapping selection ahead of finger contact movement. In another embodiment, selecting content ahead of a finger can allow scrolling and selection of scrolled text. For example, while selecting text, whenever the contact movement reaches an area relative to (e.g. very close) or around the edge of a text field auto scroll can occur, and text scrolled into view can be selected. The auto scroll can scroll vertically (e.g. Up/Down), horizontally (e.g. Right/Left), or some other direction depending upon direction of drag, edge or otherwise. Scrolling can move undisplayed text into a text editing field for display.

Exemplary Embodiment for Detecting Contact Movement

Figure 8A:
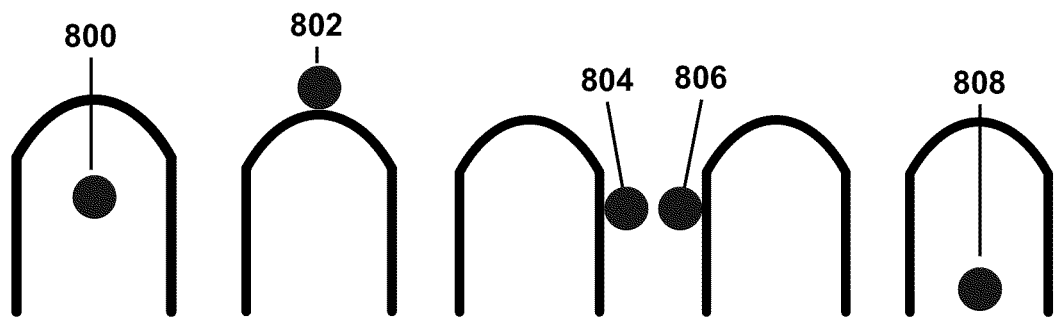
FIG. 8A illustrates various embodiments of points of contact for detecting movement with a touch screen.
Figure 8B:
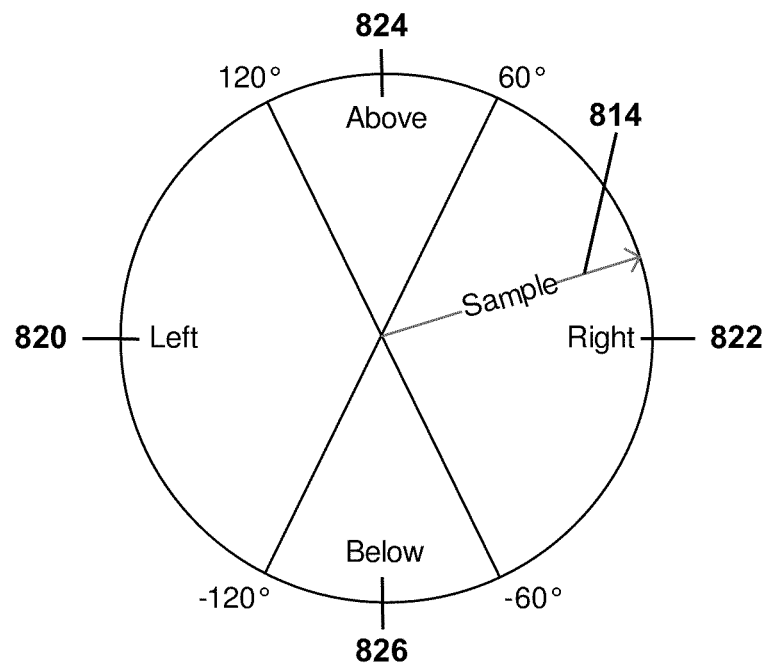
FIG. 8B illustrates an embodiment of a vector used to detect contact movement along a touch screen.

FIGS. 8A-B show embodiments of tracking contact movement in a direction along a touch screen. When an end-user is manipulating text in a touch screen display, a finger can be used. However, as a finger can cover the displayed text in a touch screen, it is desirable to define a contact point associated with a finger. For example, FIG. 8A shows fingers and various contact points. If the center of the finger shown at 800 is used as the contact point for the location in the text range a user is selecting, the finger itself will cover this point. This can prevent the user from seeing feedback as changes are made. Alternatively, a leading edge of a finger's movement can be a modified contact point 802. If the point that is used to contact is actually to the side of the finger as shown in 804 and 806, then the end-user can see the changes as they are made. In alternative embodiments, the contact point can be the same as the point reported from the touch input system, above or below the finger contact area 802, 808 when the finger is generally moving up or down, to the right or left of the finger when the finger is generally moving to the right or left. In one example embodiment, as shown in FIG. 8B to determine the direction the finger is generally moving one can store three previous points of contact and use the oldest with the current point to calculate a vector 814. This vector can be used to determine what direction the user is moving. When the vector 814 is calculated, the vector can be determined to be in a directional sector that determines the direction the contact is moving. For example, the vector can be in one of the directional sectors of left 820, right 822, above 824, or below 826. Directional sectors can be a range of angles from a reference angle. For example, a range can be a range of angles from the touch screen horizontal at zero degrees. Directional sectors can be generated to include more specific directions of movement, such as diagonally, up, down, and at various angles from the screen horizontal. A vector along the touch screen horizontal can be at zero degrees or 180 degrees from the horizontal depending on the direction of the vector with respect to the horizontal. For example, a left direction sector could be defined for vectors at angles between 120 degrees and −120 degrees from horizontal in the touch screen. Also, for example, a right direction sector could be defined for vectors at angles between 60 degrees and −60 degrees from horizontal in the touch screen.

Exemplary Advantages

The following describes exemplary advantages of various embodiments. For example, the described embodiments can provide an improved way of selecting content with touch sensitive displays. Some embodiments offer an end-user an uncomplicated way of selecting content in a composition string through direct manipulation with a finger without causing occlusion of manipulated text. Also, the described embodiments allow selection of a word upon single tapping the word. Because a single tap can be easily performed with a finger and detected on a touch screen, applying the gesture of single tapping for selection of content, instead of cursor placement, allows for a rapid and simplified selection user interface. For example, an end-user with limited dexterity in their fingers can easily select a word by single tapping on the word, instead of having to complete a more complicated gesture.

Also, in various embodiments whole words can be selected as blocks at the same time. This manner of block selection can make selection of content more efficient because an end-user is not required to select text at character level precision, which can be difficult when using a finger that can obfuscate manipulated content in a touch screen. Furthermore, in some embodiments, selecting whole words of text ahead of the direction of contact movement allows a user to clearly view what text is being selected.

Exemplary Mobile Environment

Figure 9:
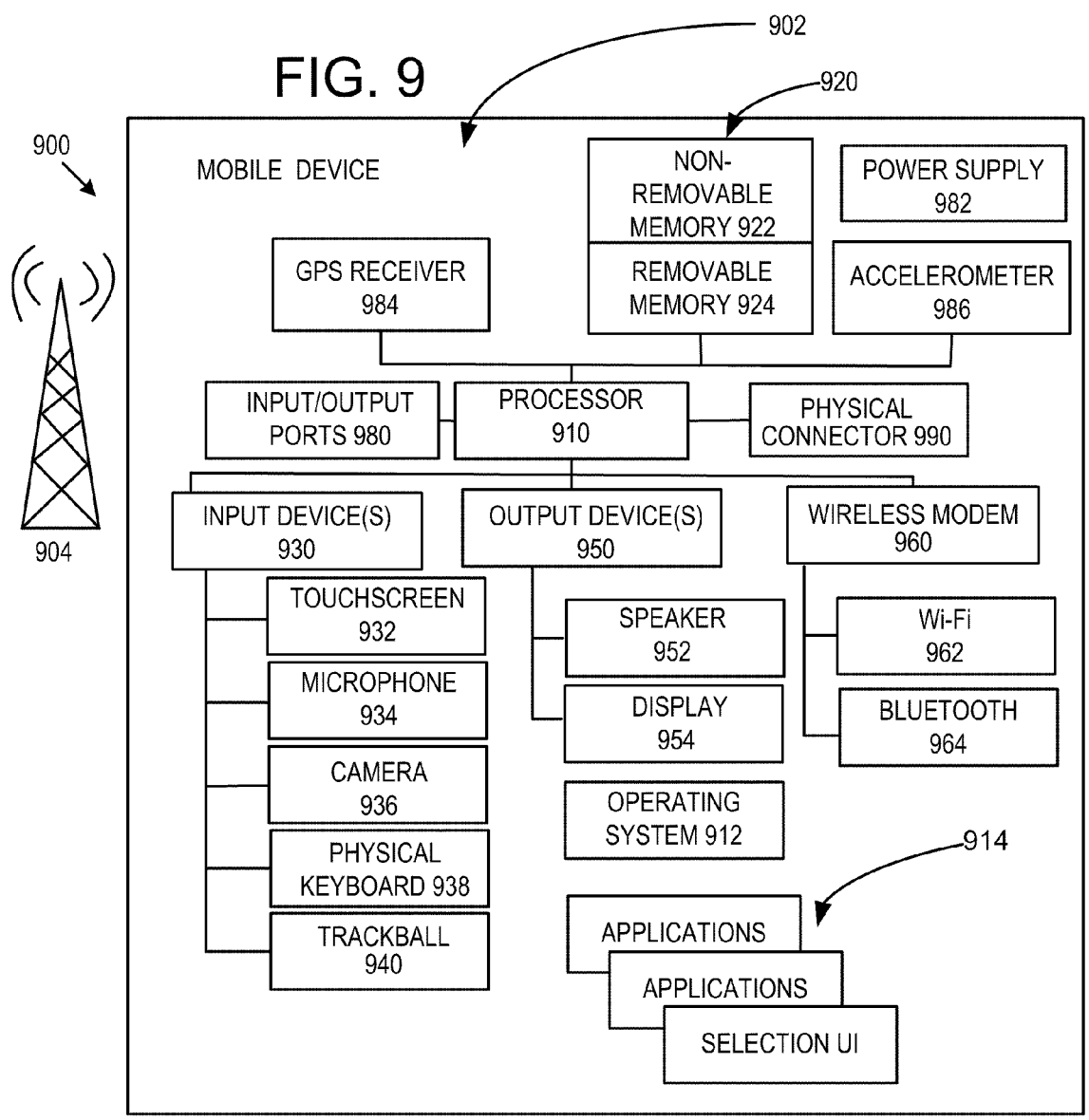
FIG. 9 is a system diagram depicting an exemplary mobile device.

FIG. 9 is a system diagram depicting an exemplary mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular or satellite network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. The applications 914 can, for example, implement the technologies described herein. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touch screen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth or Wi-Fi). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can deleted and other components can be added.

Exemplary Computing Environment

Figure 10:
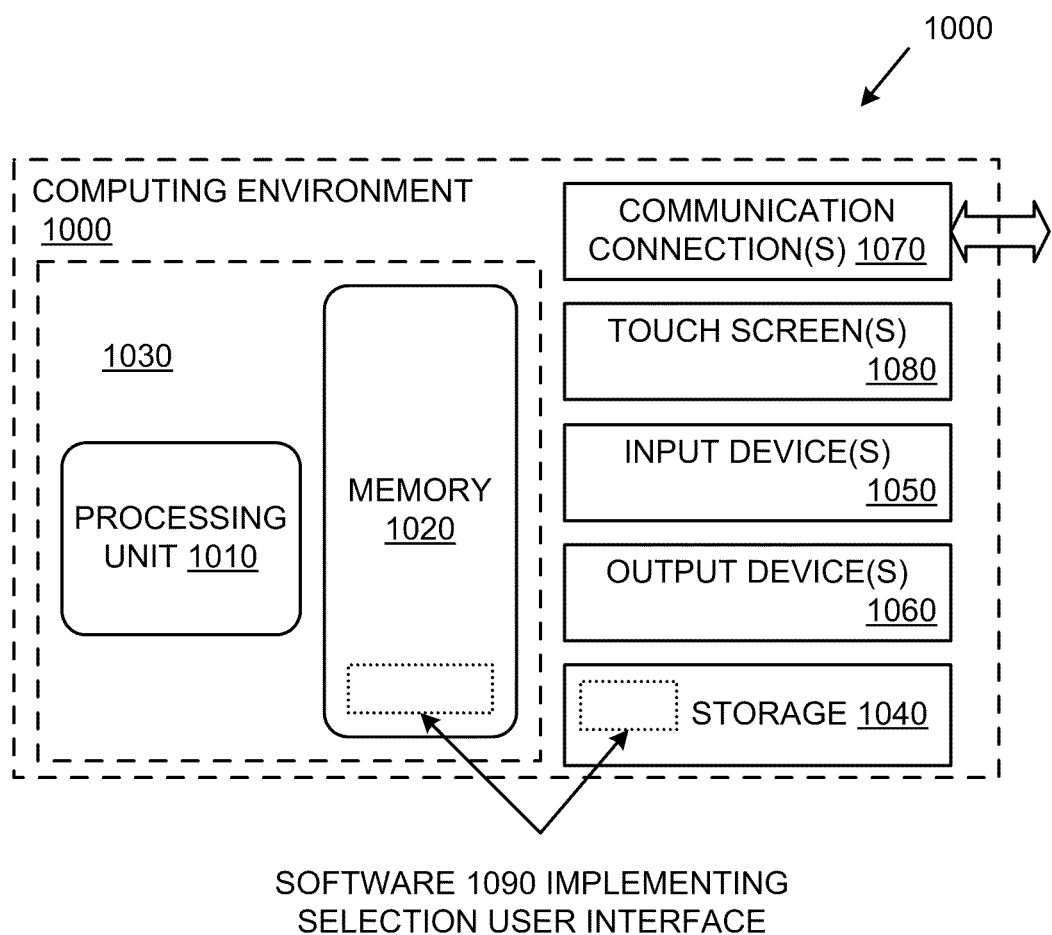
FIG. 10 illustrates a generalized example of a computing environment.

FIG. 10 illustrates a generalized example of a suitable computing environment 1000 in which described embodiments, techniques, and technologies may be implemented. For example, the computing environment 1000 can be one of the computing devices (e.g., a mobile device) used to implement the various embodiments described herein 1090.

The computing environment 1000 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 10, the computing environment 1000 includes at least one central processing unit 1010 and memory 1020. In FIG. 10, this most basic configuration 1030 is included within a dashed line. The central processing unit 1010 executes computer-executable instructions and may be a real or a virtual processor. In a multi-processing system, multiple processing units execute computer-executable instructions to increase processing power and as such, multiple processors can be running simultaneously. The memory 1020 may be volatile memory (e.g., registers, cache, RAM), non-volatile memory (e.g., ROM, EEPROM, flash memory, etc.), or some combination of the two. The memory 1020 stores software 1090 that can, for example, implement the technologies described herein. A computing environment may have additional features. For example, the computing environment 1000 includes storage 1040, one or more input devices 1050, one or more output devices 1060, and one or more communication connections 1070. An interconnection mechanism (not shown) such as a bus, a controller, or a network, interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other medium which can be used to store information and which can be accessed within the computing environment 1000. The storage 1040 stores instructions for the software 1090, which can implement technologies described herein.

The input device(s) 1050 may be a touch input device, such as a keyboard, keypad, mouse, pen, or trackball, a voice input device, a scanning device, or another device, that provides input to the computing environment 1000. The environment may also have a touch screen 1080 as an input device and display. For audio, the input device(s) 1050 may be a sound card or similar device that accepts audio input in analog or digital form, or a CD-ROM reader that provides audio samples to the computing environment 1000. The output device(s) 1060 may be a display, printer, speaker, CD-writer, or another device that provides output from the computing environment 1000.

The communication connection(s) 1070 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1000. By way of example, and not limitation, with the computing environment 1000, computer-readable media include memory 1020, storage 1040, communication media (not shown), and combinations of any of the above.

Computer-readable media are any available media that can be accessed within a computing environment 1000. By way of example, and not limitation, with the computing environment 1000, computer-readable media include memory 1020 and/or storage 1040. As should be readily understood, the term computer-readable storage media includes the media for data storage such as memory 1020 and storage 1040, and not transmission media such as modulated data signals.

Exemplary Implementation Environment

Figure 11:
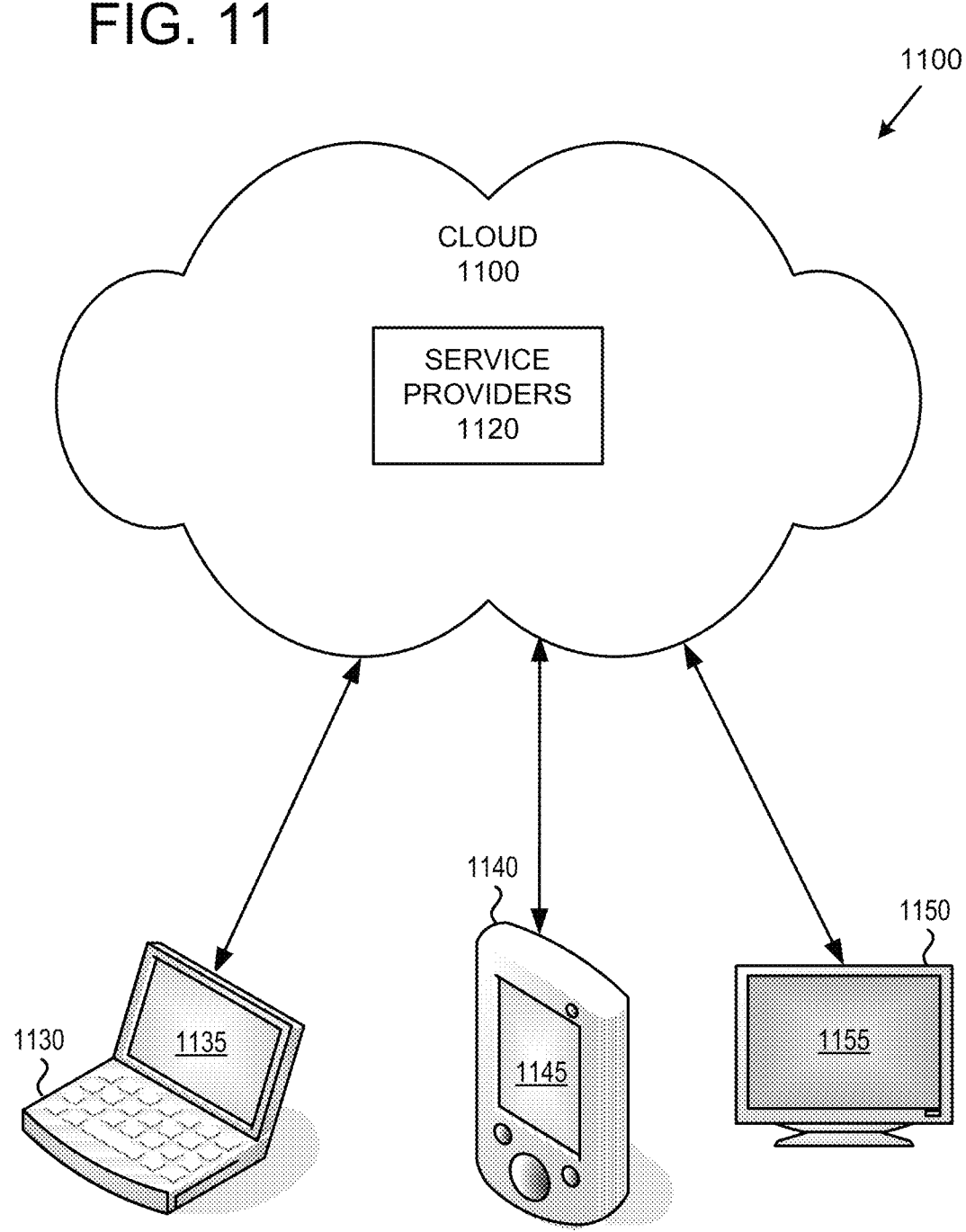
FIG. 11 illustrates a generalized example of a suitable implementation environment.

FIG. 11 illustrates a generalized example of a suitable implementation environment 1100 in which described embodiments, techniques, and technologies may be implemented.

In example environment 1100, various types of services (e.g., computing services) are provided by a cloud 1110. For example, the cloud 1110 can comprise a collection of computing devices 1130, 1140, 1150, which may be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130-1132) while other tasks (e.g., storage of data to be used in subsequent processing) can be performed in the cloud 1110.

In example environment 1100, the cloud 1110 provides services for connected devices 1130, 1140 1150 with a variety of screen capabilities that can include touch screen capability. Connected device 1130 represents a device with a computer screen 1135 (e.g., a mid-size screen). For example, connected device 1130 can be a personal computer such as desktop computer, laptop, notebook, netbook, or the like. Connected device 1140 represents a device with a mobile device screen 1145 (e.g., a small size screen). For example, connected device 1140 can be a mobile phone, smart phone, personal digital assistant, tablet computer, and the like. Connected device 1150 represents a device with a large screen 1155. For example, connected device 1150 can be a television screen (e.g., a smart television) or another device connected to a television (e.g., a set-top box or gaming console) or the like. One or more of the connected devices 1130, 1140, 1150 can include touch screen capabilities. Touch screens can accept input in different ways. For example, capacitive touch screens detect touch input when an object (e.g., a fingertip or stylus) distorts or interrupts an electrical current running across the surface. As another example, touch screens can use optical sensors to detect touch input when beams from the optical sensors are interrupted. Physical contact with the surface of the screen is not necessary for input to be detected by some touch screens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touch screen capability of a particular connected device (e.g., connected devices 1130, 1140, 1150).

In example environment 1100, the cloud 1110 provides the technologies and solutions described herein to the various connected devices 1130-1132 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Exemplary Alternatives and Combinations

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A computer-implemented method for selecting content displayed in a touch screen, the method comprising:
    detecting a single tap on a word of text in a text editing field displayed in the touch screen;
    responsive to the detecting the single tap, selecting, in whole, the word of text creating an area of selected content;
    detecting contact, with the touch screen, on the selected word of text displayed in the touch screen;
    detecting the contact, with the touch screen, moving in a direction along the selected word of text in the touch screen; and
    relative to the direction of contact movement, increasing the area of selected content by selecting a next word, in a line of text, adjacent to the selected word of text being contacted;
    wherein detecting the contact, with the touch screen, moving in the direction comprises:
        storing a plurality of points of contact with the touch screen while the contact is moving along the touch screen;
        calculating a vector based on the plurality of points; and
        determining the direction based on the vector.

2. The computer-implemented method of claim 1, wherein the word of text comprises characters of text; and
    wherein the selecting, in whole, the word of text comprises selecting, at the same time, all of the characters of text in the word.

3. The computer-implemented method of claim 1, wherein selecting the word of text comprises highlighting the word of text.

4. The computer-implemented method of claim 1, wherein selecting the next word comprises highlighting the entire next word before the contact moving in the touch screen is on the word.

5. The computer-implemented method of claim 1 further comprising:
    detecting contact movement in a second direction along the area of selected content displayed in the touch screen; and relative to the second direction of contact movement, decreasing the area of selected content by deselecting, in whole, a selected word after the contact moves off of the selected word.

6. The computer-implemented method of claim 5, wherein the deselecting a selected word comprises unhighlighting the selected word.

7. The computer-implemented method of claim 5, wherein the selected word of text comprises characters of text; and
wherein the deselecting, in whole, the selected word comprises deselecting, at the same time, all of the characters of text in the selected word.

8. The computer-implemented method of claim 1 further comprising:
detecting contact with the touch screen on a selected portion of content displayed in the touch screen;
detecting the contact, with the touch screen, moving along the touch screen in a second direction substantially perpendicular to the portion of content, wherein the content comprises lines of text; and
increasing the area of selected content by selecting wrapping text and a final selection word;
wherein wrapping text comprises text from the selected portion of content to a word the contact, with the touch screen, moves on, in a line of text;
wherein the final selection word is in the line of text that the contact, with the touch screen, moves on; and
wherein the final selection word is next to the word that the contact, with the touch screen, moves on and passed the wrapping text.

9. The computer-implemented method of claim 1, wherein the contact, with the touch screen, is made with one of: a stylus, and a finger.

10. A computer-readable storage medium comprising computer-executable instructions that when executed cause a computing device coupled to a touch screen to perform a method, the method comprising:
detecting contact with the touch screen on selected content displayed in the touch screen;
detecting the contact moving in a first direction along the selected content in the touch screen;
relative to the first direction of contact movement, selecting first additional content displayed in the touch screen by selecting a next word of text, in a first line of text adjacent to the selected content being contacted;
detecting the contact moving along the touch screen in a second direction substantially perpendicular to the first line of text that includes the selected first additional content; and
responsive to the contact moving along the touch screen in the second direction, selecting second additional content by selecting wrapping text and a final selection word;
wherein the wrapping text comprises text from the selected first additional content to a contacted word that the contact moves on in a second line of text; and
wherein the final selection word is adjacent to the contacted word that the contact moves on and the final selection word is past the wrapping text in the second line of text.

11. The computer-readable storage medium comprising computer-executable instructions of claim 10, the method further comprising:
wherein the selecting the first additional content comprises highlighting the next word of text before the contact moving in the touch screen is on the next word of text.

12. The computer-readable storage medium comprising computer-executable instructions of claim 10, the method further comprising:
wherein the selecting the first additional content comprises selecting the next word of text as the contact movement approaches the end of a selected word, that comprises the selected content, being contacted.

13. The computer-readable storage medium comprising computer-executable instructions of claim 10, the method further comprising:
detecting contact movement in a third direction along selected content displayed in the touch screen; and
relative to the third direction of contact movement, decreasing the selected content by deselecting, in whole, a selected word after the contact moves off of the selected word.

14. The computer-readable storage medium comprising computer-executable instructions of claim 10, the method further comprising:
wherein the next word of text comprises characters of text; and
wherein the selecting the next word of text comprises selecting, at the same time, all of the characters of text in the next word of text.

15. The computer-readable storage medium comprising computer-executable instructions of claim 10, wherein detecting the contact, with the touch screen, moving along the touch screen in the first direction comprises:
storing a plurality of points of contact with the touch screen while the contact is moving along the touch screen;
calculating a vector based on the plurality of points; and
determining the first direction based on the vector.

16. The computer-readable storage medium comprising computer-executable instructions of claim 15, the method further comprising:
wherein determining the first direction based on the vector comprises:
determining a directional sector that the vector is in to determine the first direction the contact is moving in;
wherein the directional sector comprises a range of angles from a reference angle.

17. A computer-implemented method for selecting content displayed in a touch screen, the method comprising:
detecting a single tap on a word of text in a text editing field displayed in the touch screen, wherein the detecting the single tap comprises detecting contact with the touch screen and then detecting removal of the contact within a predetermined period of time;
wherein text can be added to and deleted from the text editing field at a position indicated by a cursor in the field;
responsive to the detecting the single tap on the word of text, selecting the word of text in the display by highlighting the word of text, wherein the word of text comprises characters of text, and all of the characters of text of the word are highlighted at the same time;
detecting contact, with the touch screen, on the selected word of text;
detecting the contact, with the touch screen, moving in a direction along the selected word in the touch screen; and
relative to the direction of contact movement, selecting additional content displayed in the touch screen;
wherein detecting the contact, with the touch screen, moving in a direction along the selected word in the touch screen comprises:
storing a plurality of points of contact with the touch screen while the contact is moving along the touch screen;
calculating a vector based on the plurality of points; and determining a direction based on the vector; and wherein selecting additional content displayed in the touch screen comprises:

selecting a next word, in a line of text, adjacent to the selected word of text as the contact moving along the selected word of text approaches the end of the selected word of text;

wherein the next word of text comprises characters of text; and wherein the selecting the next word comprises highlighting, at the same time, all of the characters of text in the next word.

* * * * *